US012577002B2

(12) United States Patent
Steiner

(10) Patent No.: US 12,577,002 B2
(45) Date of Patent: Mar. 17, 2026

(54) GRASPING SYSTEM AND METHOD FOR INSERTING SEPARATION SHEETS IN A RECEPTACLE

(71) Applicant: BOBST MEX SA, Mex (CH)

(72) Inventor: Christophe Steiner, Crissier (CH)

(73) Assignee: BOBST MEX SA, Mex (CH)

( * ) Notice: Subject to any disclaimer, the term of this patent is extended or adjusted under 35 U.S.C. 154(b) by 691 days.

(21) Appl. No.: 17/906,493

(22) PCT Filed: Mar. 18, 2021

(86) PCT No.: PCT/EP2021/057011
§ 371 (c)(1),
(2) Date: Sep. 16, 2022

(87) PCT Pub. No.: WO2021/185994
PCT Pub. Date: Sep. 23, 2021

(65) Prior Publication Data
US 2023/0182936 A1      Jun. 15, 2023

(30) Foreign Application Priority Data

Mar. 18, 2020      (EP) ..................................... 20020123

(51) Int. Cl.
| | |
|---|---|
| *B65H 3/08* | (2006.01) |
| *B25J 15/00* | (2006.01) |
| *B25J 15/06* | (2006.01) |
| *B65B 5/10* | (2006.01) |
| *B65B 25/14* | (2006.01) |

(Continued)

(52) U.S. Cl.
CPC ........... *B65B 5/108* (2013.01); *B25J 15/0061* (2013.01); *B25J 15/0658* (2013.01); *B65B 25/145* (2013.01); *B65B 35/18* (2013.01); *B65B 61/207* (2013.01); *B65H 3/0808* (2013.01); *B65H 3/0816* (2013.01); *B65H 5/08* (2013.01); *B65H 5/14* (2013.01); *B25J 13/088* (2013.01); *B65H 2301/5121* (2013.01);

(Continued)

(58) Field of Classification Search
CPC ...... B65H 3/0808; B65H 3/0816; B65H 5/08; B65H 5/10; B65H 5/12; B65H 5/14
See application file for complete search history.

(56) References Cited

U.S. PATENT DOCUMENTS

| | | | |
|---|---|---|---|
| 3,045,561 A | 7/1962 | Roy |
| 5,286,016 A | 2/1994 | Franks |

(Continued)

FOREIGN PATENT DOCUMENTS

| | | |
|---|---|---|
| CH | 659627 A5 | 2/1987 |
| CN | 102264602 A | 11/2011 |

(Continued)

*Primary Examiner* — Luis A Gonzalez
(74) *Attorney, Agent, or Firm* — Bookoff McAndrews, PLLC

(57) ABSTRACT

The invention relates to grasping system comprising a grasping head (15) for a sheet transporting device, in particular for transporting an insert sheet to be inserted between rows of folding boxes in a receptacle, the grasping head (15) having at least one support frame (80) and a plurality of aspiration elements (17, 18). The aspiration elements (17, 18) are mounted on holding elements (50) which are received on the support frame (80) so as to be displaceable with respect to the support frame (80).

20 Claims, 10 Drawing Sheets

(51) Int. Cl.

| | | |
|---|---|---|
| *B65B 35/18* | (2006.01) |
| *B65B 61/20* | (2006.01) |
| *B65H 5/08* | (2006.01) |
| *B65H 5/14* | (2006.01) |
| *B25J 13/08* | (2006.01) |

(52) U.S. Cl.

CPC ................. *B65H 2406/342* (2013.01); *B65H 2701/1766* (2013.01); *B65H 2701/1827* (2013.01)

(56) References Cited

U.S. PATENT DOCUMENTS

| | | | |
|---|---|---|---|
| 5,984,623 A | 11/1999 | Smith et al. | |
| 6,086,321 A * | 7/2000 | Takahashi ............... | B25J 9/1612 414/793 |
| 2004/0240972 A1* | 12/2004 | Mori .................... | B65G 49/068 414/222.01 |
| 2006/0261537 A1* | 11/2006 | Dangelewicz ....... | B65H 3/0816 271/106 |
| 2012/0317934 A1 | 12/2012 | Takai et al. | |
| 2019/0031378 A1 | 1/2019 | Riedmann | |
| 2019/0047807 A1 | 2/2019 | Chatry et al. | |
| 2019/0161223 A1 | 5/2019 | Brizzi | |

FOREIGN PATENT DOCUMENTS

| | | | | | |
|---|---|---|---|---|---|
| CN | 104512567 A | 4/2015 | | |
| CN | 104936874 A | 9/2015 | | |
| CN | 107367519 A | 11/2017 | | |
| CN | 109071143 A | 12/2018 | | |
| CN | 109476385 A | 3/2019 | | |
| CN | 109715502 A | 5/2019 | | |
| CN | 109911622 A | 6/2019 | | |
| CN | 110255234 A | 9/2019 | | |
| CN | 110712793 A | 1/2020 | | |
| DE | 10121344 A1 * | 11/2002 | ......... | B25J 15/0616 |
| DE | 102009010694 A1 | 9/2010 | | |
| DE | 102011114707 A1 | 4/2013 | | |
| EP | 0550114 A1 | 7/1993 | | |
| EP | 2540629 A1 | 1/2013 | | |
| EP | 3587137 A1 | 1/2020 | | |
| JP | H09194037 A | 7/1997 | | |
| JP | 2001341088 A | 12/2001 | | |
| JP | 2005262325 A | 9/2005 | | |
| JP | 2008162760 A | 7/2008 | | |
| JP | 2013169640 A | 9/2013 | | |
| JP | 6255772 B2 | 1/2018 | | |
| JP | 2019521918 A | 8/2019 | | |
| WO | 2017017718 A1 | 2/2017 | | |
| WO | 2017202500 A1 | 11/2017 | | |
| WO | 2019049104 A1 | 3/2019 | | |

* cited by examiner

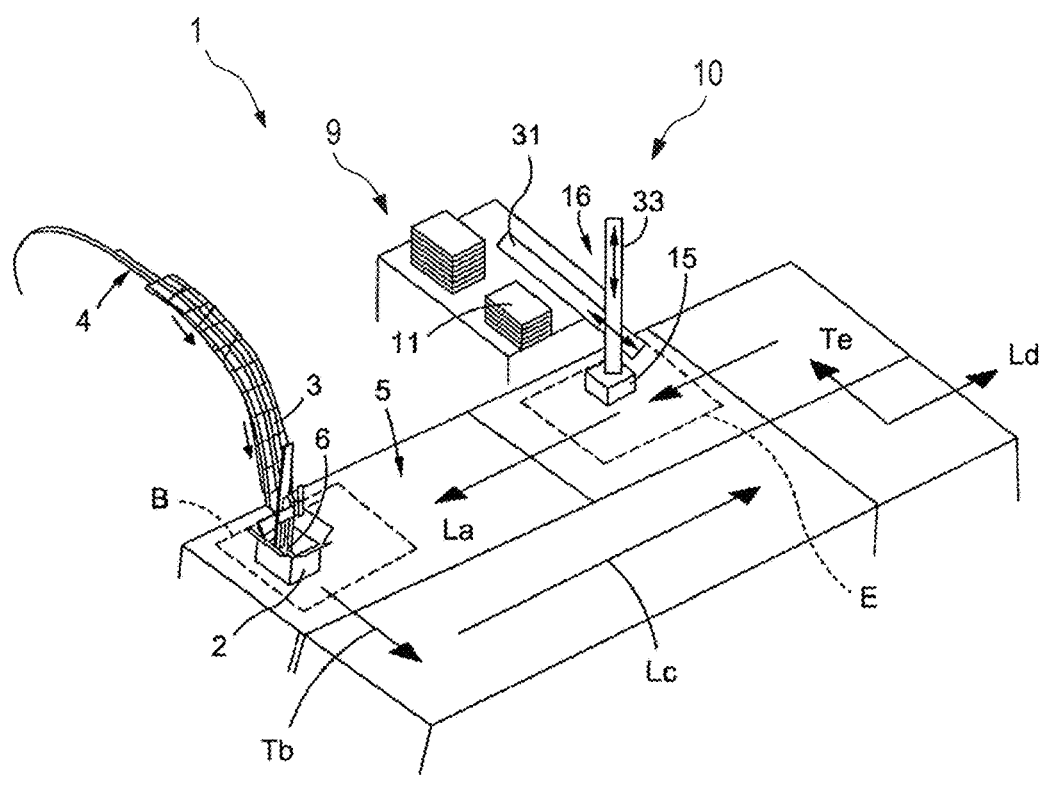
Fig. 1
(Prior Art)
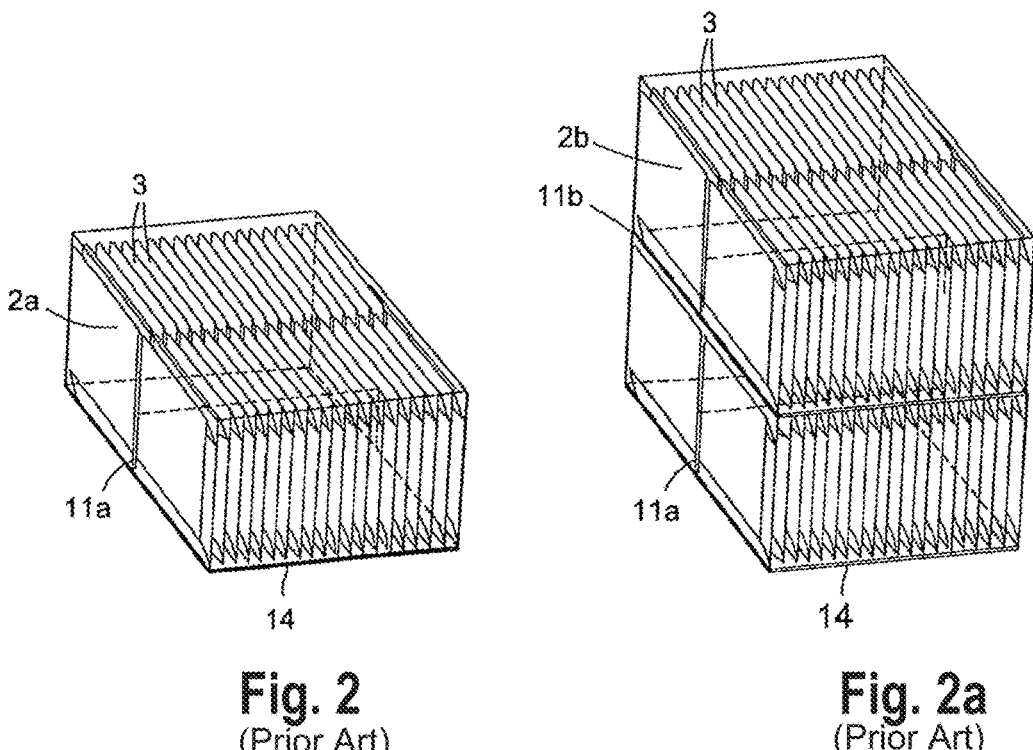
Fig. 2
(Prior Art)
Fig. 2a
(Prior Art)

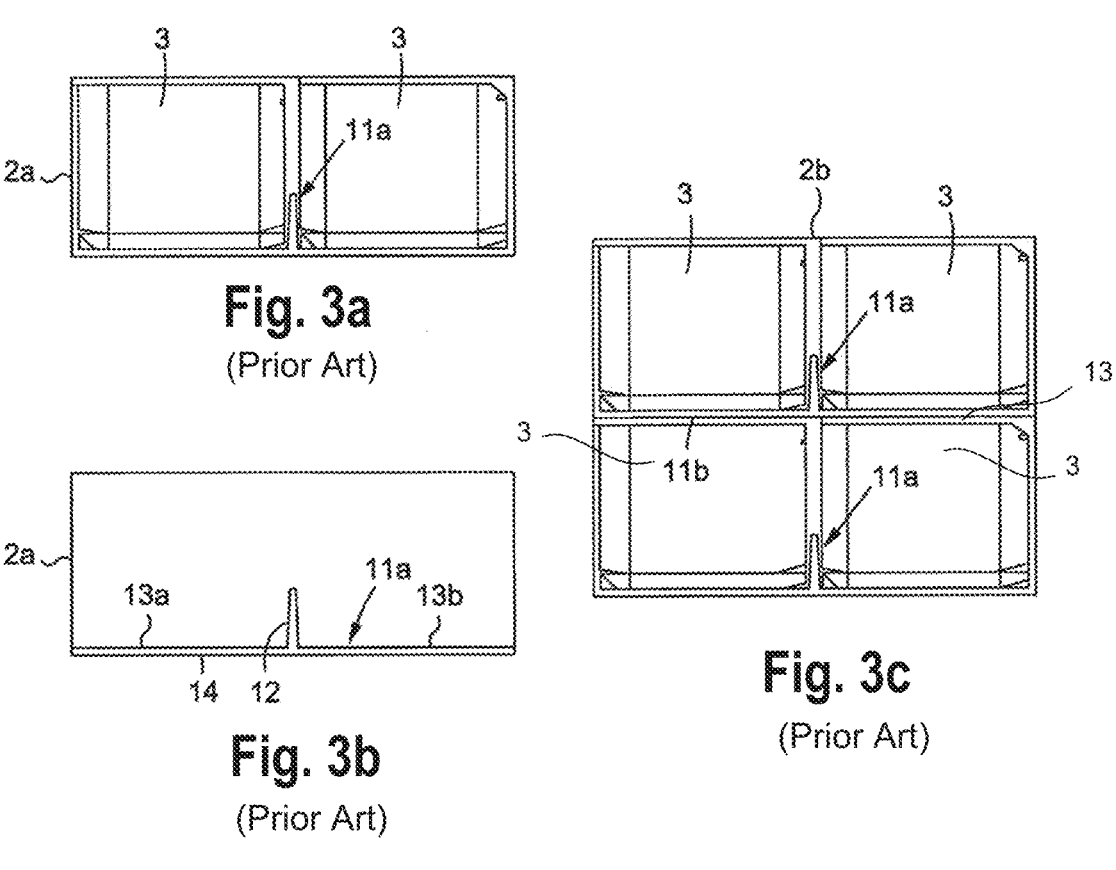
Fig. 3a
(Prior Art)
Fig. 3b
(Prior Art)
Fig. 3c
(Prior Art)
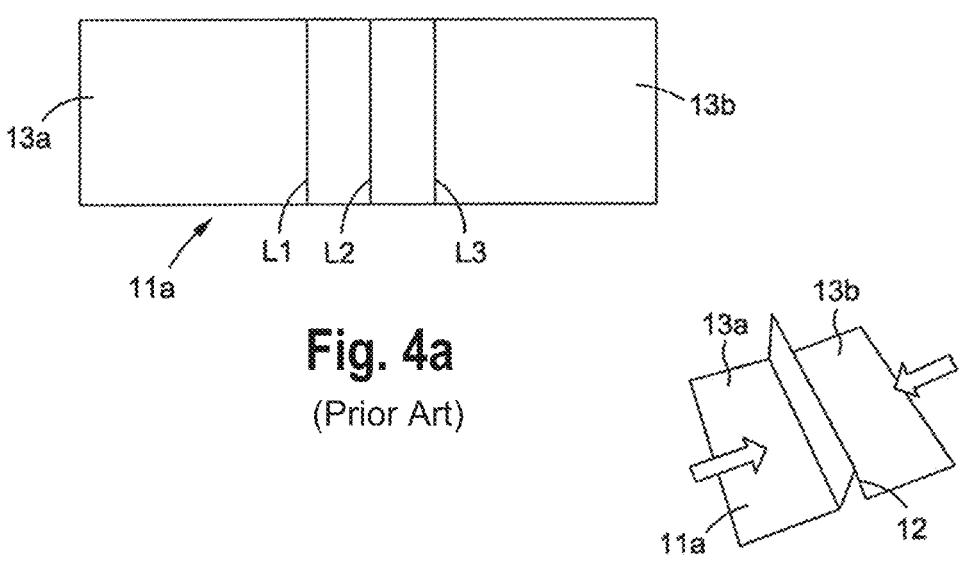
Fig. 4a
(Prior Art)
Fig. 4b
(Prior Art)

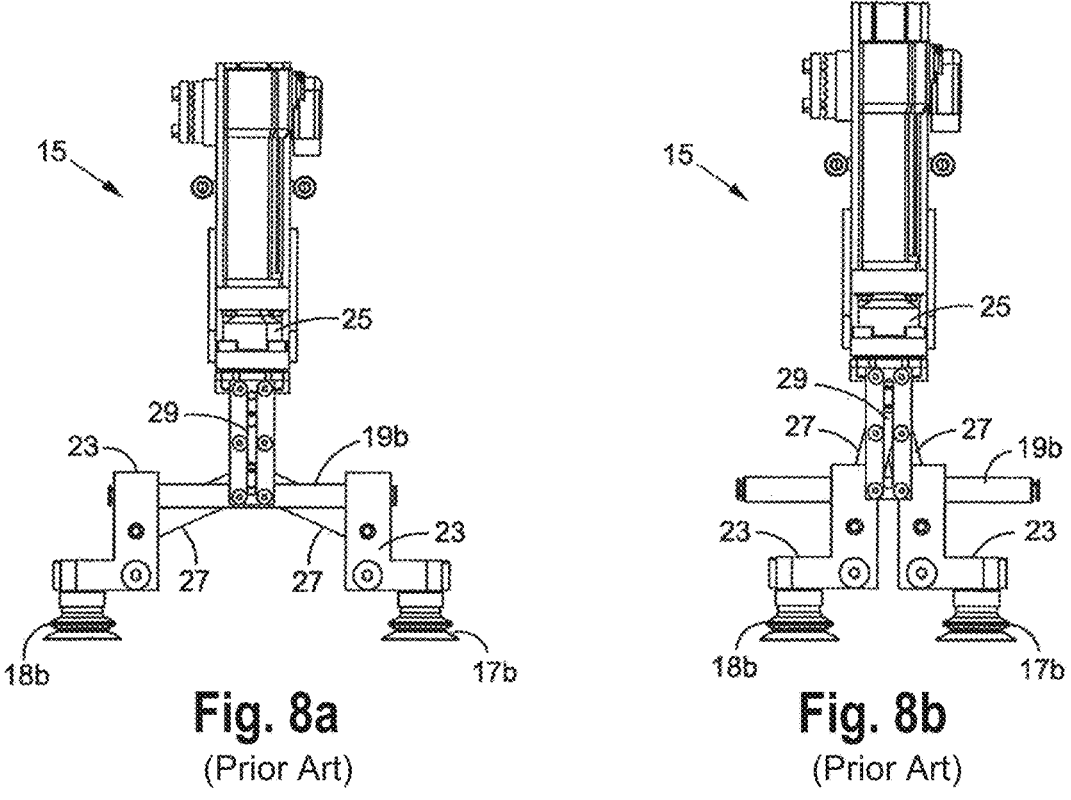
Fig. 8a
(Prior Art)
Fig. 8b
(Prior Art)
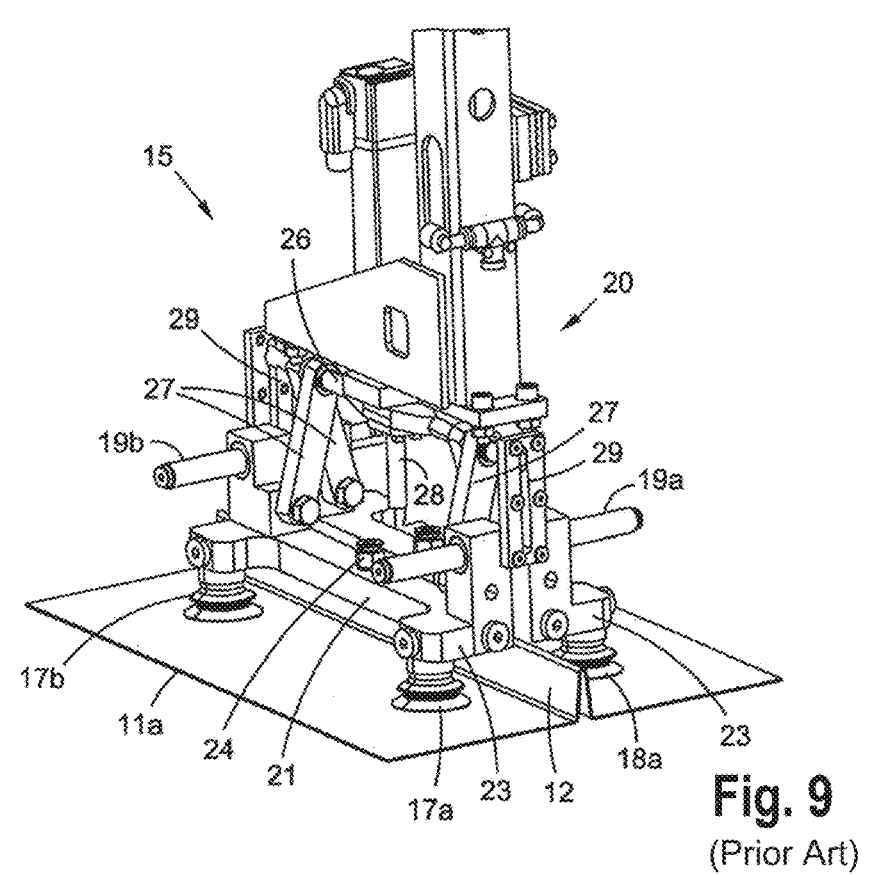
Fig. 9
(Prior Art)

GRASPING SYSTEM AND METHOD FOR INSERTING SEPARATION SHEETS IN A RECEPTACLE

CROSS-REFERENCE TO RELATED APPLICATION(S)

This patent application is a National Stage Application under 35 U.S.C § 371 of International Patent Application No. PCT/EP2021/057011, filed on Mar. 18, 2021, which claims priority to European Patent Application No. 20020123.4, filed on Mar. 18, 2020, the entireties of which are incorporated herein by reference.

FIELD OF INVENTION

The present invention relates to a grasping system for grasping, transporting and inserting an insert sheet between rows of folding boxes in a receptacle. Such a grasping system can be used together with a folder-gluer machine.

BACKGROUND OF THE INVENTION

Folder-gluer machines glue and fold flat folding boxes which will contain products such as blister packs for drugs or other products, for example those packaged in a food or pharmaceutical industry. A plurality of flat folded boxes may then be stored effectively in receptacles (also known as containers) for delivery to manufacturers.

Document CH 659627 describes an example of a device for filling receptacles with folding boxes coming from a folder-gluer machine. The folded boxes are at the end of the folder-gluer machine delivered by a box conveyor to a receptacle. Each receptacle may contain a significant number of folded boxes, such as several dozens or hundreds of boxes.

In order to form separated and stable rows of folding boxes in the receptacle, an inserting process is required. The inserting process consists in arranging an insert sheet in the empty receptacle to form a partition between the rows of folding boxes. This operation of inserting an insert sheet is necessary to prevent the boxes from crossing over, for example, during the transporting of the filled receptacle.

The insert sheet is typically a sheet of creased and sliced cardboard, generally so as to preform three parallel folding lines. The folding lines enable the insert sheet to form a "V" when folded at the folding lines. A flap is located on each side of the three parallel folding lines.

When two lateral flaps of the insert sheet are approached towards each other, the insert sheet has a three-dimensional shape with a planar fold substantially perpendicular to the flaps. The dimension of the flaps corresponds to the dimension of the bottom of the receptacle such that when the folded insert sheet is placed in the receptacle, the planar fold is positioned vertically.

In production, a worker is often assigned to insert manually a vertical insert sheet between two rows of boxes. The boxes are then arranged on either side of the vertical insert sheet.

A sheet transporting device with a grasping head is known from the document WO2017/202500 A1. It serves for inserting sheets between rows of folding boxes in a receptacle, in a downstream portion of a folder-gluer machine.

WO2017/202500 A1 discloses a machine and a method for automatically grasping, folding and inserting a folded insert sheet into a receptacle. The machine has a grasping head which grasps an insert sheet, and a drive which moves the grasping head from the place where the insert sheet is being grasped, to a place where the insert sheet is to be placed. This machine is briefly described in the following with reference to FIGS. 1 to 9.

FIG. 1 shows a general view of the elements of a station 1 for filling of receptacles 2 (also known as containers) with folding boxes 3, the station 1 being possibly placed at the exit of a folder-gluer machine.

The folding boxes 3 may be prepared by a folder-gluer machine which glues and folds the boxes 3 flat, which can then be stockpiled, in the folded and glued state, with a reduced footprint in receptacles 2 for the purpose of being transported. The term "folding box" here denotes the folding boxes folded flat in order to be arranged in a receptacle 2.

The receptacle 2 can for instance be a box of parallelepiped form, able to hold a plurality of folding boxes 3. For example, the receptacle 2 is made of cardboard. A receptacle 2 filled with two rows of folding boxes 3 positioned on the edge is shown as an illustration in FIG. 2.

At a filling station 1, such as can be seen in FIG. 1, a conveyor 5 of receptacles delivers empty receptacles 2 to a filling zone B where the receptacles 2 are loaded with folding boxes 3. Once loaded, the receptacle 2 is moved from the filling zone B on an evacuation section Lc (arrow Tb). The loaded receptacles 2 are then evacuated to an exit along the evacuation section Lc, transporting the receptacle 2 to the filling zone B, but in the opposite direction. The loaded receptacles 2 are evacuated to the outside of the conveyor 5 (arrow Ld).

The receptacles 2b can carry out a new loading cycle by being reintroduced at the start of the conveying to carry out a new loading with a second level of boxes (arrow Te). The receptacle 2b has a capacity and thus a greater height to allow the entry of the second level of boxes (see FIGS. 2a and 3c).

A box transporter-filler 4 is designed to grasp the folding boxes 3, arranged for example in a sheet at the exit from the folder-gluer machine, and to transfer them to the filling zone B. The folding boxes 3 having traveled a substantially arc-shaped path are arranged in orderly manner in a receptacle 2 by means of the movable end 6 of the box transporter-filler 4. The folding boxes 3 are thus generally arranged in at least two rows of boxes 3 alongside each other, vertically straightened, the rows being separated by a folded insert sheet 11a (FIG. 3a).

The insert sheet 11a is a sheet of cardboard, for example, creased to preform at least three folding lines L1, L2, L3 (See FIGS. 4a and 4b). The folding lines L1, L2, L3 are parallel to each other. Once folded, the insert sheet 11a has a planar fold 12 perpendicular to a planar base formed by two lateral flaps 13a, 13b of the insert sheet 11a, placed one against the other by folding (FIG. 4b). The insert sheet 11a is dimensioned so that, once folded, the planar base has dimensions complementary to those of the bottom surface 14 of the receptacle 2 (FIG. 3a, 3b). The folding lines L1, L2, L3 for example are centered so that the planar fold 12 is in the center, and then the cross section of the folded insert sheet 11a placed on its base will have an inverted T shape.

The filling station 1 comprises an inserting device 10 making it possible to grasp an insert sheet 11 from a stack, fold the insert sheet 11 along the folding lines L1, L2, L3, and then arrange the folded insert sheet 11 in an empty receptacle 2 before it is filled with folding boxes 3. These operations, also known as "inserting", make it possible to separate and maintain the folding boxes 3 in the receptacle 2 in a least two firmly stable rows.

For this, the inserting device 10 comprises a grasping head 15 and a drive means 16 designed to displace the grasping head 15 at least along a vertical movement, such as a straight line, and a horizontal movement, for example another straight line.

The inserting device 10 likewise comprises a conveyor 5 making it possible to bring up successive packs of inserts in order to ensure a nonstop inserting operation. While the last insert of a pack is grabbed and inserted into the receptacle, the conveyor 5 advances and brings up the next insert pack.

As best seen in FIG. 6, the grasping head 15 comprises at least one first aspiration element 17a, 17b, at least one second aspiration element 18a, 18b, at least one linear element 19a, 19b on which is mounted and able to move by sliding at least the first aspiration element 17a, 17b, as well as a controllable actuating mechanism 20.

In the example represented in FIG. 6, 7a, 7b, 8a, 8b, 9, the grasping head 15 comprises two first aspiration elements 17a, 17b, two second aspiration elements 18a, 18b and two linear elements 19a, 19b. One of the first aspiration elements 17a and one of the second aspiration elements 18a are mounted to slide on the first linear element 19a.

The other of the first aspiration elements 17b and the other of the second aspiration elements 18b are mounted to slide on the second linear element 19b.

The aspiration elements 17a, 17b, 18a, 18b are designed to grasp an insert sheet 11. They comprise respective supports 23, for example, in the form of a bracket, at the lower ends of which are arranged aspiration openings. These aspiration openings are situated in a horizontal plane.

The aspiration openings are connected to a vacuum source, for example, by means of flexible hoses and at least one valve. The valve, for example a controllable valve, may be located between the vacuum source and the flexible hoses and may be controlled by a control unit 30 in order to establish or cut off a low pressure in the aspiration openings. Thus, when a vacuum is transmitted to the aspiration openings, an insert sheet 11 can be grasped by suction.

The aspiration elements 17a, 17b, 18a, 18b may likewise comprise suction cups, arranged in the area of the aspiration openings, in order to facilitate the grasping of the insert sheet 11 by improving the tightness between the insert sheet 11 and the aspiration openings.

At least the first aspiration elements 17a, 17b can be displaced by sliding on the linear elements 19a, 19b by the actuating mechanism 20 between a grasping position (FIGS. 7a, 8a and 6) a folding position (FIGS. 7b, 8b and 9).

In the grasping position (FIGS. 7a, 8a and 6), the first aspiration elements 17a, 17b and the second aspiration elements 18a, 18b are positioned at a spacing from each other. This position allows the aspiration elements 17a, 17b, 18a, 18b to be able to grasp an insert sheet 11 lying flat, by suction of the lateral flaps 13a, 13b.

In the folding position (FIGS. 7b, 8b and 9), the first aspiration elements 17a, 17b and the second aspiration elements 18a, 18b are brought closer together as compared to the grasping position. This coming closer of the aspiration elements 17a, 17b, 18a, 18b makes it possible to fold the insert sheet 11. A gap is devised between the supports 23 of the aspiration elements 17a, 17b, 18a, 18b in particular to avoid wedging the central planar fold 12 (FIGS. 8b and 9).

The two first aspiration elements 17a, 17b are joined together by a first support bar 21 and the two second aspiration elements 18a, 18b are joined together by a second support bar 22. The support bars 21, 22 make it possible to ensure a good stability for the aspiration elements 17a, 17b, 18a, 18b as well as good planarity of the aspiration openings. A duct may be devised in the support bars 21, 22 to connect the aspiration openings to each other and to a common connection 24 of each bar 21, 22, to which a flexible hose connected to the pump may be connected.

The actuating mechanism 20 is designed to likewise displace the second aspiration elements 18a, 18b by sliding on the linear elements 19a, 19b between the grasping position and the folding position. The actuating mechanism 20 is designed to allow a simultaneous displacement of the same amplitude of the support bars 21, 22 toward each other, which enables the folding of an insert sheet 11 with a central planar fold 12.

The linear elements 19a, 19b on which the aspiration elements 17a, 17b are mounted to slide comprise for example one cylindrical rod each. Complementary cylindrical holes are devised, for example, in the uprights of the supports 23 of the aspiration elements 17a, 17b, 18a, 18b. The actuating mechanism 20 comprises a controllable actuator 25 and a system of connecting rods.

The system of connecting rods comprises a vertically movable transverse axle 26 connected to the controllable actuator 25 and at least one connecting rod 27, there being four of them in the present example.

A first end of the connecting rod 27 is pivotably connected to the transverse axle 26 and a second end of the connecting rod 27 is pivotably connected to an aspiration element 17a, 17b, 18a, 18b.

In the example, each aspiration element 17a, 17b, 18a, 18b is connected to the transverse axle 26 by a respective connecting rod 27, the transverse axle 26 passing through cylindrical openings of the first ends of the connecting rods 27. The second ends of the connecting rods 27 are pivotably mounted on the supports 23, for example by means of pivots.

The connecting rods 27 are preferably all of the same dimension, which enables a simultaneous displacement of the same amplitude for the support bars 21, 22 toward each other or away from each other.

In operation, the lowering of the transverse axle 26 inclines the connecting rods 27 toward the horizontal, moving the first aspiration elements 17a, 17b away from the second aspiration elements 18a, 18b. On the other hand, the raising of the transverse axle 26 straightens out the connecting rods 27, closing the V-shaped opening between the connecting rods 27, which brings the first aspiration elements 17a, 17b closer to the second aspiration elements 18a, 18b.

The controllable actuator 25 comprises an electric motor. The actuating mechanism 20 comprises for example a screw 28 designed to be driven in rotation by the electric motor, the screw 28 being inserted vertically in a thread of the transverse axle 26, perpendicular to the latter. The screw 28 is, for example, a ball screw. Balls inserted between the screw 28 and the transverse axle 26 ensure the rolling function, which allows limiting the friction and achieving rapid movements.

A rotation in a first direction of the electric motor drives the raising of the transverse axle 26 (FIG. 7b) and a rotation in the opposite direction drives the lowering of the transverse axle 26 (FIG. 7a). The actuating mechanism 20 further comprises at least one guide groove (or slot) 29 designed to cooperate with one end of the transverse axle 26 to guide the vertical displacement of the transverse axle 26. Two guide grooves 29 may thus cooperate with one respective end of the transverse axle 26.

The inserting device 10 further comprises a control unit 30, such as a computer, a control unit, or a microcontrol unit, comprising a memory and programs making it possible to execute series of instructions enabling in particular a control of the drive means 16 and/or the actuating mechanism 20 and/or the creating of the vacuum in the first and second aspiration elements 17a, 17b, 18a, 18b.

The drive means 16 comprises a rectilinear guide 31 secured horizontally to a frame and a carriage 32 able to slide along the rectilinear guide 31. The rectilinear guide 31 is, for example, a rail, a rack, or a belt. The drive means 16 likewise comprises an arm 33 extending in the vertical direction, at the end of which is attached the grasping head 15. The arm 33 is able to move vertically in a base carried by the carriage 32.

Controllable motors of the drive means 16 are designed to displace the carriage 32 along the rectilinear guide 31 and to displace the arm 33 vertically in the base. The drive means 16 thus allows a control of the vertical displacement of the grasping head 15 on the one hand, above a work station, to lower and grab an insert sheet 11 and lift the insert sheet 11 back up, and on the other hand, above an inserting zone E, to lower the insert sheet 11 into a receptacle 2 and again raise the grasping head 15, having offloaded its insert sheet 11. Likewise, the drive means 16 enables a control of the rectilinear horizontal displacement allowing the transport of an insert sheet 11 from the work station to the inserting zone E and the return of the grasping head 15 from the inserting zone E to the work station to grab a new insert sheet 11.

A conveyor 34 may be provided at the workstation to continuously convey stacks of insert sheets 11 (FIG. 5).

FIG. 5 in conjunction with FIGS. 8a, 8b and 9 illustrate the different steps of a method for grasping, folding, and loading of an insert sheet 100 by the inserting device 10.

The control unit 30 controls the drive 16 to position the grasping head 15 above an insert sheet 11 laid flat at a workstation, the first and second aspiration elements 17a, 17b, 18a, 18b being positioned away from each other in the grasping position. Next, the control unit 30 orders the creating of a vacuum in the first and second aspiration elements 17a, 17b, 18a, 18b in order to grasp the insert sheet 11, the grasping position allowing the grasping of the insert sheet 11 by suction in the area of the side flaps 13a, 13b.

Next, the control unit 30 controls the means of controllable displacement in a rectilinear vertical displacement to raise the grasping head 15, then in a rectilinear horizontal displacement to direct it to the inserting zone E where an empty and open receptacle 2 has been delivered by the conveyor 5 of receptacles. The control unit 30 then orders the rotation of the electric motor to raise the transverse axle 26 (FIG. 7b) and thus straighten out the connecting rods 27. The first and second aspiration elements 17a, 17b, 18a, 18b slide toward each other on the linear elements 19a, 19b, bringing the first aspiration elements 17a, 17b and the second aspiration elements 18a, 18b closer together, which enables the folding of the insert sheet 11 which has been grasped (FIG. 9).

This folding may be done in flight, that is, during the transport of the insert sheet 11 to the inserting zone E and especially during the horizontal displacement of the grasping head 15. The control unit 30 then orders the drive means 16 to vertically lower the grasping head 15 into the receptacle 2.

The vacuum is maintained in the aspiration elements 17a, 17b, 18a, 18b until such time as the head 15 has placed the insert sheet 11 on the bottom of the receptacle 2. The control unit 30 then orders the halting of the vacuum to release the insert sheet 11. The insert sheet 11 remains folded in the receptacle 2 with the planar fold 12 maintained vertically by cooperation of the bottom surface 14 and the side flaps 13a, 13b (FIG. 3b).

The control unit 30 then orders the raising of the grasping head 15 and controls a rotation in the opposite direction of the electric motor to lower the transverse axle 26, the lowering of the latter being guided by the guide grooves 29. The lowering of the transverse axle 26 inclines the connecting rods 27 toward the horizontal, moving the first aspiration elements 17a, 17b away from the second aspiration elements 18a, 18b.

This control in the grasping position may be realized during the vertical raising or transportation of the grasping head 15.

The receptacle 2 containing a folded insert sheet 11 may then be delivered by the conveyor 5 of receptacles along the delivery section La up to the filling zone B where it can receive folding boxes 3 having been delivered by the box transporter-filler 4.

SUMMARY OF THE INVENTION

An object of the present invention is to further improve the machine disclosed in WO2017/202 500 A1 in order to obtain a more precise and safer control of the vertical movement of the grasping head. This object is solved by a grasping system according to claim 1 and a method of introducing an insert sheet according to claim 17.

According to a first aspect, the present invention relates to a grasping system for placing an insert sheet between rows of folding boxes in a receptacle, the grasping system comprising a grasping head configured to grasp and pick up the insert sheet from a loading location, displace and position the insert sheet on a depositing surface in the receptacle, the grasping head having a support frame and a plurality of gripping elements configured to adhere to the upper surface of the insert sheet, the gripping elements being connected to the support frame via a plurality of holding elements, which are movably mounted to the support frame, and wherein the holding elements and the gripping elements are movable in the vertical direction in relation to the support frame when the gripping elements contact the insert sheet or the depositing surface in the receptacle, and wherein the grasping system further comprises a control unit and sensing arrangement, the sensing arrangement being configured to sense a vertical displacement of the holding elements with respect to the support frame, and wherein the control unit is configured to receive information from the sensing arrangement and determine when the grasping head is brought into contact with an insert sheet or a depositing surface.

The vertical direction can be defined as a direction that is perpendicular to a top surface of the insert sheet, i.e. the normal to the insert sheet. The vertical direction may coincide with the gravitational direction. Consequently, the horizontal direction can be defined by the plane of the insert sheet surface. Additionally, the horizontal direction can be defined as 90° in relation to the vertical direction.

The invention is based on a realization that the contact of the gripping elements on the insert sheet can be adapted to ensure the deposit of the insert sheet at a correct height, and at the same time limit the impact and potential damage to the insert sheet and the row of folding boxes. The movable gripping elements and holding elements thus enable the grasping head to yield and deposit the insert sheet at the right height and in contact with the folding boxes in the receptacle and yield when the gripping element comes into contact the row of folding boxes in the receptacle.

The depositing surface can be an upper surface of a row of folding boxes or a bottom surface in the receptacle.

In an embodiment, the control unit is further configured to stop a further vertical downward movement of the grasping head when the sensing arrangement senses a vertical movement of at least one of the holding elements.

In an embodiment, the holding element is a rod which is received in an opening in the support frame, and wherein the rod comprises a free end onto which the gripping element is attached. The opening can be a guiding opening for the rod. The vertical displacement can therefore be an axial displacement in the longitudinal extension of the holding elements.

The gripping elements can be biased away from the support frame by biasing members. The biasing members can be mounted around each of the rods and suspended between a first abutment surface located on the support frame and a second abutment surface located on the holding elements. Alternatively, the biasing member is a pneumatic or gas cylinder. The pneumatic cylinder may be mounted inside the leg. The biasing members ensure that the gripping elements are always in a precisely defined position when there is no contact with an insert sheet.

The control unit of the grasping system may be configured to control the displacement of the grasping head and to operate the gripping elements in an alternating way between a gripping state and a release state such that the gripping elements are in a gripping state when the grasping head contacts the insert sheet in the loading location and in a release state when the grasping head subsequently contacts the depositing surface with the insert sheet.

In an embodiment, the grasping system further comprises a memory comprising spatial coordinates of a first descent position and spatial coordinates of a second descent position of the grasping head, the first and second descent positions defining a starting point of a first and second vertical descent trajectory, and wherein the first decent trajectory is vertically aligned with the loading location and the second descent trajectory is vertically aligned with the depositing location and wherein the control unit is configured to operate the grasping head to be moved into the first descent position and the second descent position, respectively.

The end points of the first and second vertical descent trajectories can be defined by a first and second vertical end position, and wherein the first vertical end position and the second vertical end position are only defined by the sensing arrangement In an embodiment, the grasping system comprises a rectilinear guide and wherein the grasping head is linearly movable and guided by the rectilinear guide in a lateral direction, and wherein the descent positions are defined as one-dimensional coordinates in the horizontal plane in a direction along a longitudinal extension of the rectilinear guide.

In an embodiment, the sensing arrangement comprises at least one position sensor located on the support frame and at least one detection element located on at least one holding element, and wherein the position sensor is configured to sense a displacement of the detection element.

For a simple system, one sensor can be used to retrieve a representative value of the displacement of the holding elements. Alternatively, in another embodiment, more than one holding element can be provided with a sensing arrangement if additional measurement accuracy is needed.

The sensor can be a magnetic sensor or an inductive sensor and the detection element may comprise a metallic material. The detection element can be a mechanical stop mounted on the holding element, and wherein the mechanical stop is configured to limit the downward movement of the holding element in relation to the frame. The mechanical stop can be a separate annular part mounted around the rod. The sensor can thus be a position sensor, as it is configured to detect a change in position of the detection element.

In an embodiment, the sensing arrangement comprises a force sensor configured to detect a contact pressure between the gripping elements and the contact surface on the insert sheet. This makes it possible to set different thresholds of contact pressures at which the gripping elements should be in a gripping state/configuration and a release state/configuration.

In another embodiment, at least one of the holding elements may comprise at least one optically readable reference point and wherein the position detector is an optical sensor.

In another embodiment, the sensing arrangement may comprise an electromechanical sensing switch comprising a mechanical latch configured to be activated at a predetermined displacement distance of the gripping elements, and wherein the control unit is configured to activate and deactivate the gripping elements in response to an activation of the electromechanical switch.

This typically works by the initial activation of the switch when the grasping head is contacting the insert sheet such that gripping elements grip the sheet (e.g. the vacuum suction cups are activated). Then the following time the gripping elements contacts a surface it will be on the rows of folding boxes in the receptacle and the gripping elements will be deactivated such that the insert sheet is released. Hence, the electromechanical switch can be used in an alternating way such that the gripping elements are activated and deactivated.

In an embodiment, the support frame comprises a first frame portion comprising a first group of gripping elements and a second portion comprising a second group of gripping elements, and wherein the first and second frame portions are movable in relation to each other between a distal position in which the first and second group of gripping elements are located distal from each other and a proximate position, in which the gripping elements are located closer to each than in the distal position other, such that the first and second group of gripping elements are horizontally displaceable in relation to each other. This provides a horizontal displacement and spacing of the gripping elements and thus creates a movement that folds the insert sheet.

In an embodiment, the gripping elements can be aspiration elements, configured to apply a suction force against the insert sheet. The holding element can be provided with an internal duct connected to the aspiration element, and wherein a vacuum line is connected to an end of the rod which is opposite the aspiration element.

In an embodiment, the control unit is configured to apply a vacuum to the grasping head when the sensor detects a displacement of the holding element with respect to the support frame and when the control unit is determining that the grasping head is at the loading location.

Additionally, the gripping elements may also be configured to discharge air to apply a positive pressure against the insert sheet when the control unit determines the grasping head being in contact with the depositing surface.

The control unit may be configured to stop a downward movement of the grasping head when the sensing arrangement detects a vertical displacement of the holding element with respect to the support frame.

Preferably, the control unit is configured to gradually stop/decelerate the downward movement of the grasping head when the sensing arrangement detects a vertical displacement of the holding element with respect to the support frame.

According to a second aspect, the present invention relates to a method of introducing an insert sheet into a receptacle or between rows of folding boxes by using a grasping head comprising a plurality gripping elements which are mounted on vertically displaceable holding elements, movably connected to a support frame, the method comprising the steps of:

Moving the grasping head to be vertically aligned with a loading location and descending the grasping head so that the gripping elements contact an upper surface of an insert sheet, Moving the support frame portion further downwards a predetermined distance whereby the support frame moves in relation to the holding elements and the gripping elements remain stationary against the upper surface of the insert sheet, Detecting a displacement of at least one holding member and stopping a further downward movement of the grasping head, Grasping the insert sheet such that the insert sheet adheres to the gripping elements, Picking up, displacing and positioning the insert sheet such that the insert sheet is aligned with an opening in the receptacle, Descending the grasping head and placing the insert sheet on a depositing surface in the receptacle, Moving the support frame portion further downwards a predetermined distance whereby the support frame moves in relation to the holding elements and while the insert sheet remains stationary against the upper surface of the insert sheet, Detecting a displacement of at least one holding element and stopping a further, downward movement of the grasping head, and Releasing the gripping elements from the insert sheet.

The grasping of the insert sheet may advantageously be performed by aspiration.

In an embodiment, the method may further comprise the steps of:

Detecting, with a sensor, a vertical displacement of the holding elements, and

Stopping the vertical movement of the grasping head.

BRIEF DESCRIPTION OF THE DRAWINGS

The invention will now be described by way of example and with reference to embodiments shown in the enclosed drawings, where the same reference numerals will be used for similar elements and in which:

FIG. 1 shows elements of a filling station, in particular a box conveyor/filler, a receptacle conveyor, and an inserting device according to the prior art;

FIG. 2a shows an example of a receptacle with side walls shown as transparent, the receptacle being loaded with folding boxes arranged in orderly manner with a folded insert sheet inserted between the two rows of boxes;

FIG. 2b shows another example of a receptacle whose side walls are shown as transparent, the receptacle being loaded with folding boxes arranged in orderly manner with a folded insert sheet inserted between the two rows of boxes, and with two levels of folding boxes, a folded insert sheet being inserted between two levels;

FIGS. 3a and 3c show a cross sectional view of the receptacle, the folding boxes and the insert sheets of FIGS. 2a and 2b;

FIG. 3b shows a view similar to FIG. 3a in which the folding boxes have been removed;

FIG. 4a shows a diagram of an insert sheet before folding, seen from above;

FIG. 4b shows a perspective view of the insert sheet of FIG. 4a during the folding process;

FIG. 8a shows a side view of the grasping head of FIG. 7a;

FIG. 8b shows a side view of the grasping head of FIG. 7b;

FIG. 9 shows a perspective view of the grasping head of FIG. 7b having pivoted 180° and carrying a folded insert sheet;

DETAILED DESCRIPTION

Figure 5:
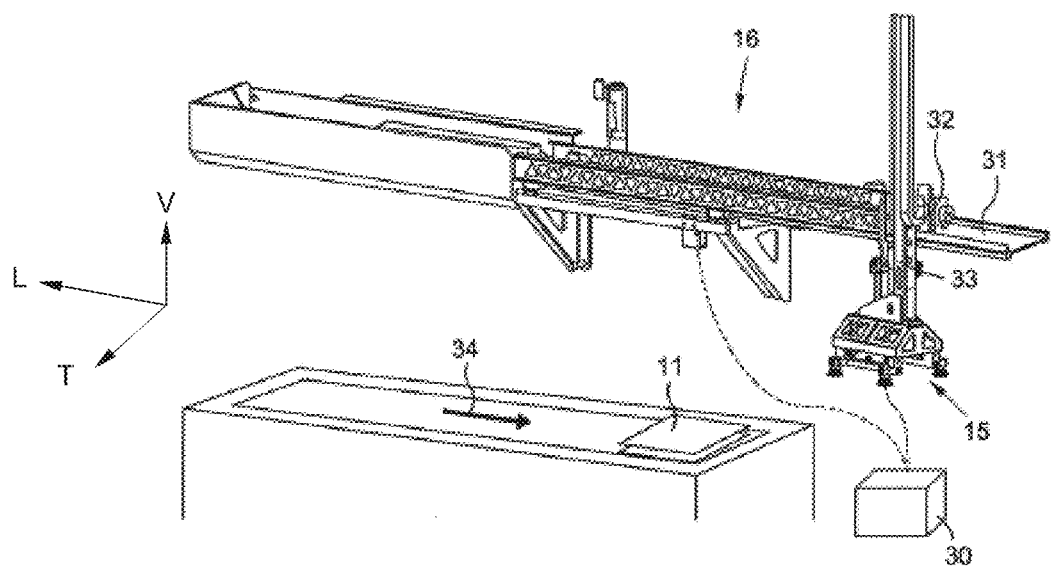
FIG. 5 shows a perspective view of the inserting device of FIG. 1.
Figure 6:
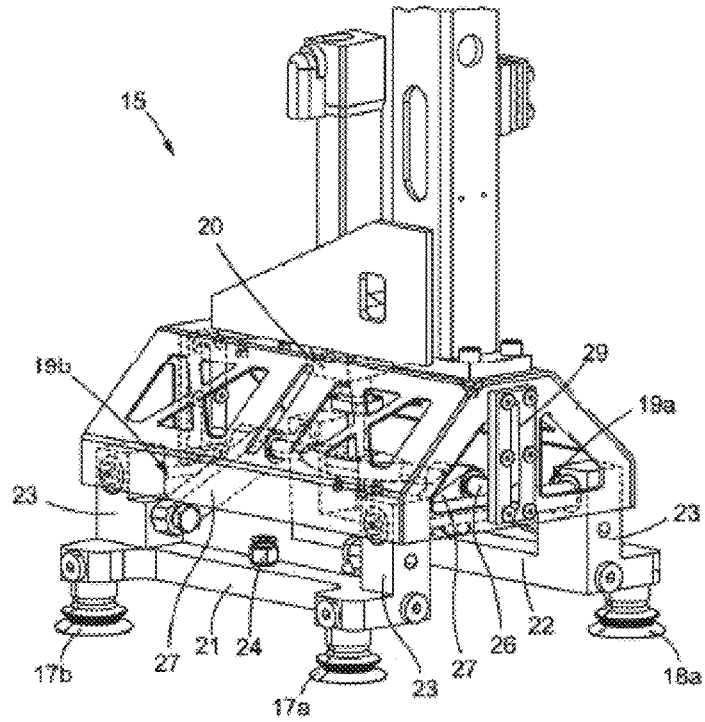
FIG. 6 shows a perspective view of a grasping head of the inserting device of FIG. 5 with hood elements shown as being transparent, the aspiration elements being represented in the grasping position.
Figures 7A, 7B:
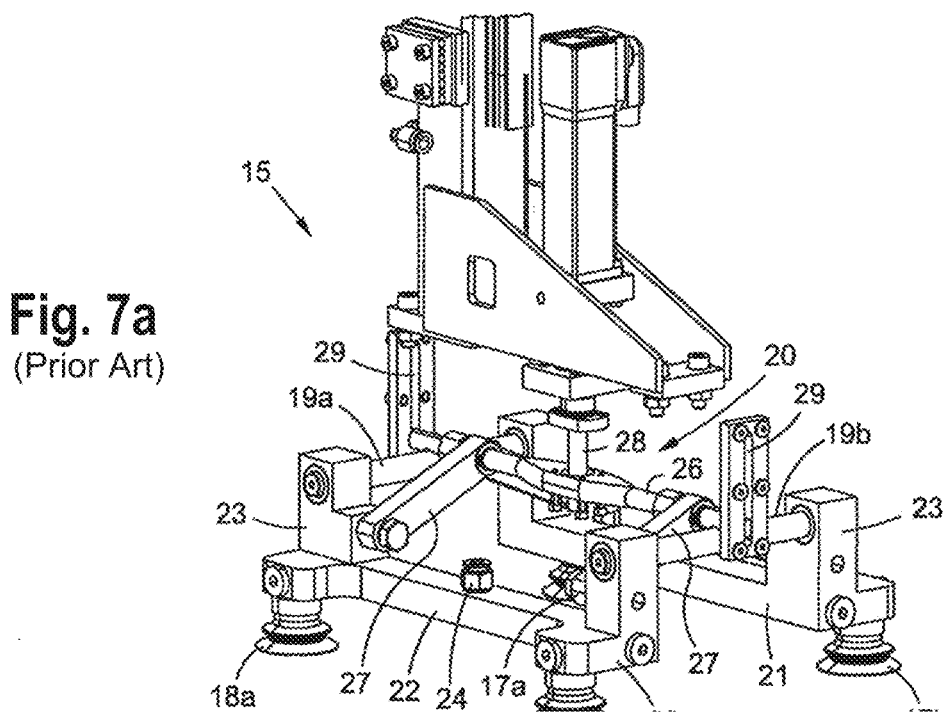
FIG. 7a shows a view of the grasping head of FIG. 6 where the hood elements have been removed to better display an actuating mechanism.
FIG. 7b shows a view similar to FIG. 7a with the aspiration elements in the folding position.

An embodiment of the present invention will now be described with reference to FIGS. 10 to 15. For those elements which are known from FIGS. 1 to 9, the same reference numerals are used, and only the differences in construction and operation between the grasping head of the prior art and the grasping head as shown in FIGS. 10 to 14 will be discussed in the following.

A main difference between the prior art grasping system and the grasping system 15' of FIGS. 10 to 14 is that gripping elements 17, 18 of the grasping head 15 according to the present invention are mounted to the grasping head 15 so as to be displaceable with respect to support bars 21, 22 of the support frame 80. In particular, the gripping elements 17, 18 are mounted so as to be displaceable in a direction which is parallel to the vertical direction along which grasping head 15 is moved by drive means 16 when descending to pick up or deposit an insert sheet 11.

Figure 13:
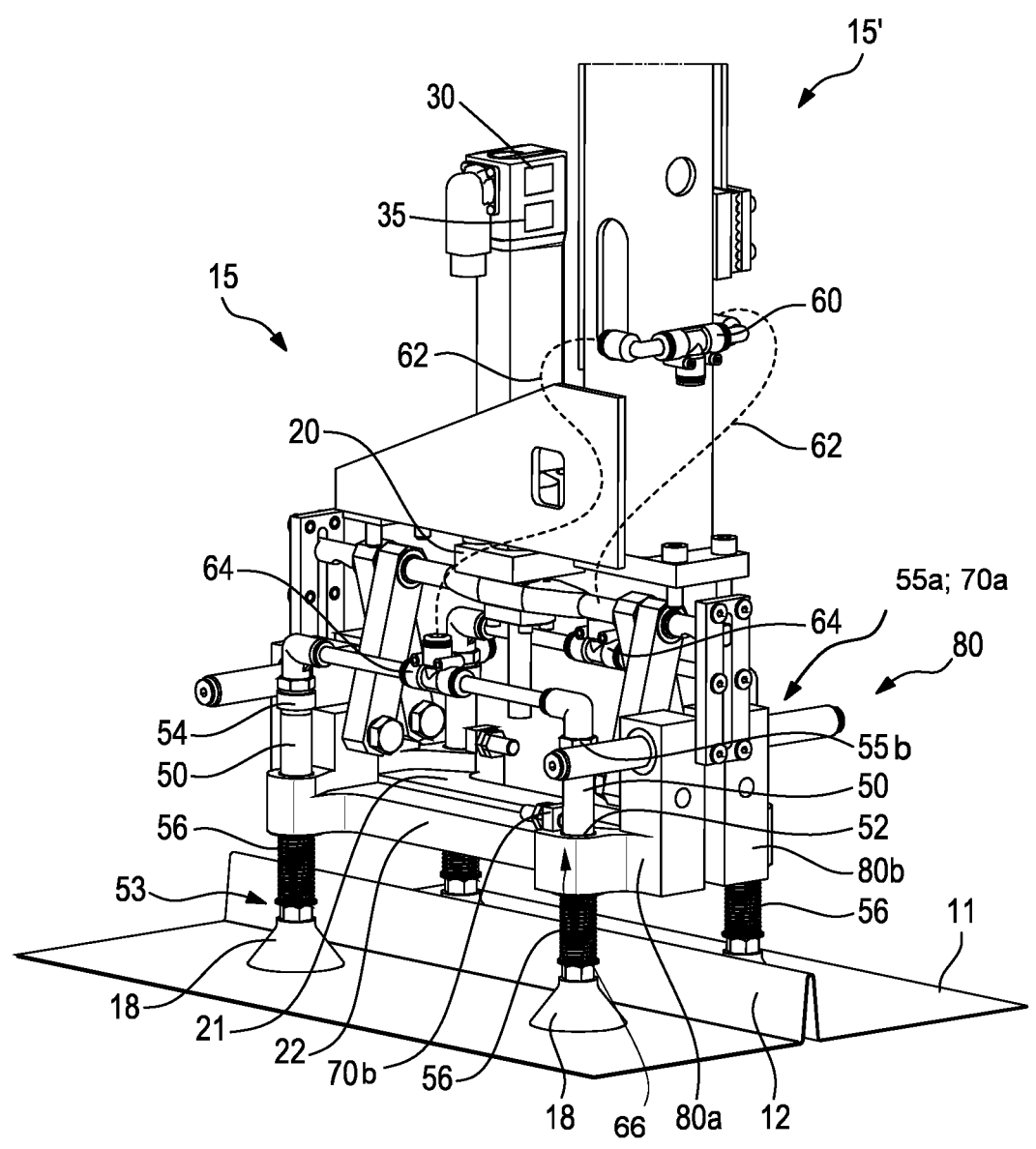
FIG. 13 shows in a perspective view the insert head of FIG. 12 in a condition in which an insert sheet is being grasped.

In the embodiment shown in the drawings, the gripping elements 17, 18 are mounted at the lower ends of holding elements 50, which are here formed as rods. The lower ends of the holding elements 50 are configured as free ends, onto which the gripping elements 17, 18 are mounted. The holding elements 50 are displaceably received in the support bars 21, 22. In the illustrated example, and as best seen in FIG. 13, the holding elements 50 are received within openings 52 provided in the support bars 21, 22. The gripping elements 17, 18 are displaceable in a direction defined by the axial extension of the holding elements 50.

At the upper ends of holding elements 50, a stop 54 is arranged. The stop 54 limits the downward movement of the holding elements 50 with respect to support bars 21, 22 by abutting at the upper surfaces of the support bars 21, 22.

Figure 14:
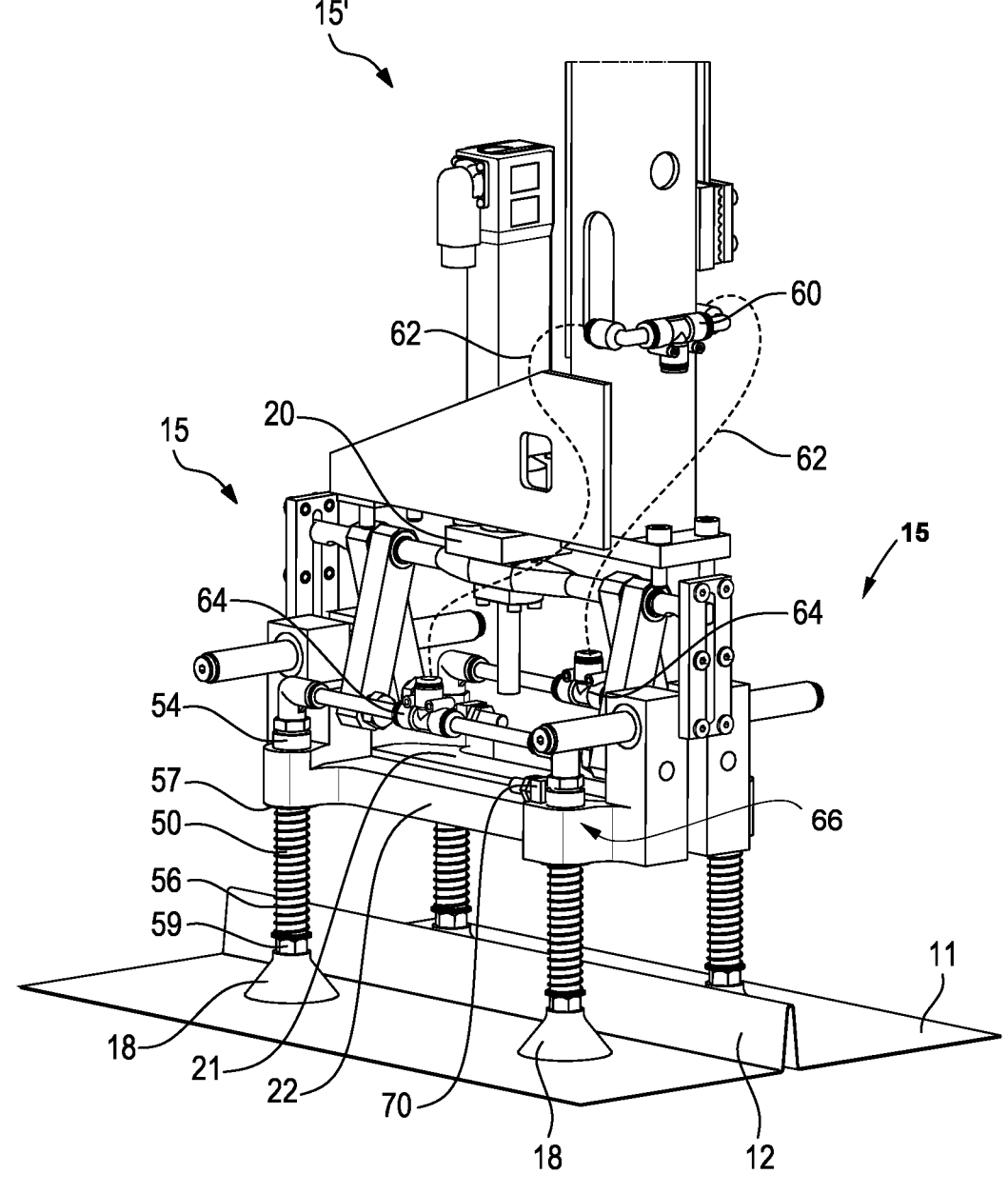
FIG. 14 shows in a perspective view the insert head of FIG. 13 in a condition in which an insert sheet is being transported.

Underneath the support bars 21, 22 of the support frame 80 (and thus between the support bars and the gripping elements 17, 18, a biasing means 56 is provided which biases the gripping elements 17, 18 away from support bars 21, 22. In the illustrated embodiment, the biasing means 56 are formed as compression springs 56 mounted around the rod-shaped holding elements 50. As best seen in FIG. 14, the compression springs 56 are suspended between a first abutment surface 57 located on the support frame 80 and a second abutment surface 59 located on the holding elements 50.

As illustrated in the figures, the gripping elements 17, 18 are preferably configured as aspiration elements 17,18. The aspiration elements 17, 18 are connected to a vacuum generator (not shown). However, other types of mechanical gripping elements are also possible. For applying a vacuum to the aspiration elements 17, 18, a vacuum connection 60 is provided at the grasping head 15. The vacuum connection 60 is connected via vacuum lines 62 to a distribution line 64 which in turn is connected to the upper ends of holding elements 50 (the end which is opposite to the end at which aspiration elements 17, 18 are provided).

From the upper end of holding elements 50, a bore or duct extends in the interior of holding element 50 towards aspiration elements 16, 17 so that a vacuum can be applied to aspiration elements 17, 18 by applying a vacuum to vacuum connection 60. The vacuum duct can also be configured to discharge/blow air in order to release the vacuum and push the insert sheet 11 away from the aspiration elements 17, 18 as the insert sheet 11 is to be placed on top of the row of folding boxes 3.

As best seen in FIGS. 13 and 14, associated with at least one of holding elements 50 is a sensing arrangement 66, comprising a sensor 70 for detecting a displacement of a detection element 55 located on the respective holding element 50. The displacement is determined with respect to the support 20, 21 at which the holding elements 50 are mounted. Hence, the sensor 70 may be configured to sense when the detection element 55 is in proximity with the sensor 70 and is further configured to sense a displacement when the detection element 55 is moved further away from the sensor 70.

The sensor 70 can be a magnetic sensor or an inductive sensor. The sensor 70 is adapted for detecting a displacement of the respective holding element 50 upwardly with respect to the position shown in FIG. 11. The detection element 55 may be located on the stop 54 and preferably comprises a material which can be detected by the magnetic or inductive sensor 70. For instance, the material can be a metallic material.

As can be seen in FIG. 14, the detection element 55 on the stop 54 is arranged at the same vertical height as the sensor 70, and opposite the sensor 70 when aspiration elements 17, 18 are not pressed against the insert sheet 11 (in the loading location or against the row of folding boxes). Hence, the sensor 70 and detection element 55 are aligned when the gripping elements 17, 18 are located in their lowest position, in which they are placed at a maximum distance from the respective support frame 21, 22. As illustrated in FIG. 13, the detection element 55 on the stop 54 is arranged further away from the sensor 70 when the aspiration elements 17, 18 are pressed against the insert sheet 11.

Figure 10:
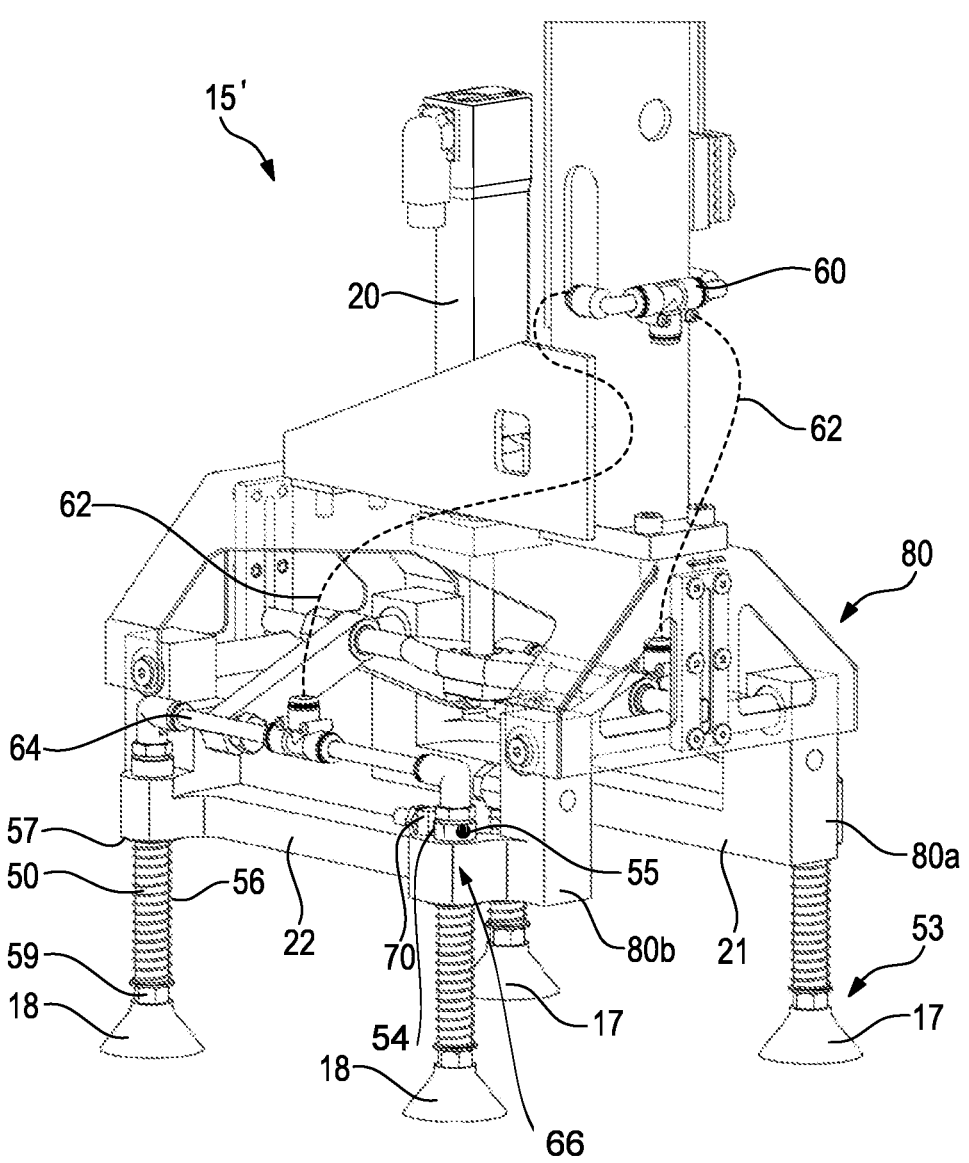
FIG. 10 shows a grasping head according to an embodiment of the present invention in a perspective view.

In the embodiment illustrated in FIG. 10, the sensing arrangement 66 comprises one sensor 70 and one detection element 55. However, in the embodiment illustrated in FIG. 13, the grasping system 15' comprises a first sensor 70$a$ and a second sensor 70$b$ which are reading a first detection element 55$a$ and a second detection element 55$b$, respectively. This is advantageous when the support frame 80 comprises a first frame portion 80$a$ comprising a first group of gripping elements 17 and a second frame portion 80$b$ comprising a second group of gripping elements 18. The control unit 30 may be configured to receive signals from both sensors 70$a$, 70$b$ and only enable the operation of the gripping elements 17, 18 when both sensor signals have been received. Hence, the operation of the gripping elements 17, 18 is enabled when both sensors 70$a$, 70$b$ have determined a displacement of each respective detection element 55$a$, 55$b$.

Preferably, the first sensor 70$a$ and the first detection element 55$a$ are located on the first frame portion 80$a$, and the second sensor 70$b$ and second detection element 55$b$ are located on the second frame portion 80$b$. In an embodiment, the first sensor 70$a$ and the second sensor 70$b$ are arranged in a diagonal manner on the first and second frame portions 80$a$, 80$b$, respectively. In such a way, the first and second sensors 70$a$, 70$b$ are arranged diagonally over the folding lines L1, L2. L3 when grasping the insert sheet 11. This enables a detection if the insert sheet 11 is not flat at its loading location 9 (e.g. if the stack of insert sheets 11 is not flat). In such a case, the grasping head 15 can be operated to activate the gripping elements 17, 18 when both the first detector 70$a$ and the second detector 70$b$ have sensed a contact with the insert sheet 11 (or deposit location). Optionally, a threshold distance can be applied to limit further downward movement after the first sensor 70$a$ has sensed a contact. The threshold distance is the vertical distance of the grasping head 15 after the first sensor 70$a$ has sensed a contact. For example, this threshold distance can be set to approximately 50 mm. The threshold distance enables deceleration and stop of the grasping head 15. Alternatively, instead of a threshold distance, a threshold time duration can be used. Similarly, the threshold time duration is set from the time when the first sensor 70$a$ has sensed a contact. The threshold distance or threshold time enables a stop of the grasping head 15 if the second sensor 70$b$ does not sense a contact.

Alternatively, a sensor 70 can be provided for each gripping element 17, 18. In the illustrated embodiment, there would be four sensors 70.

Figure 15:
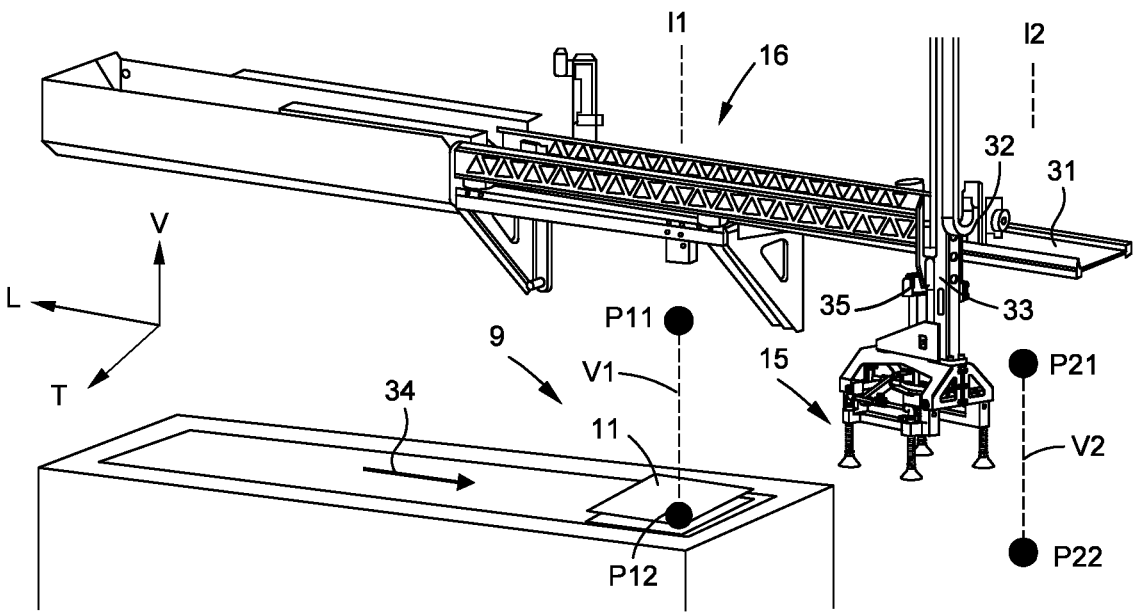
FIG. 15 shows in a perspective view the grasping system according to the present invention.

As best seen in FIG. 15, the grasping head 15 can be linearly operated in the lateral direction L and the vertical direction V. The lateral direction L is in the horizontal plane. The lateral direction L may be perpendicular to a transport direction T of the recipient 2 at the position of the grasping head 15.

A first descent position P11 for the grasping head 15 can be vertically aligned with the loading position P12 of the insert sheet 11 at the loading location 9. Similarly, a second descent position P21 for the grasping head 15 is located vertically aligned with a deposit position P22. The deposit position P22 is in the recipient 2. The first and second descent positions P11, P21 can be defined as coordinates in a memory 35 of the grasping system 15'. In an embodiment, the first and second descent positions P11, P21 are only defined in a first 11 and second lateral coordinate 12 in the lateral direction L. A restricted movement in the lateral direction L can be achieved by a rectilinear guide 31 configured to guide the grasping head 15 in the lateral direction L.

Hence, the first descent position P11 can be defined in a one-dimensional spatial coordinate I1. Similarly, the second descent position P21 can be defined in one-dimensional spatial coordinate I2. These coordinates I1, I2 define the starting points (in the horizontal plane) of vertical descent trajectories V1, V2 at the loading location 9 and the deposit location 13, respectively. The first descent trajectory V1 at the loading location 9 extends between the first descent position P11 and the first vertical end position P12 (corresponding to the loading position). The second descent trajectory V2 at the deposit location 13 extends between the second descent position P21 and the second vertical end position P22.

In another embodiment, there is no rectilinear guide. In this embodiment, the descent positions P11, P21 are defined in a two-dimensional horizontal plane defined by the longitudinal axis T and the lateral axis L. The coordinates I1, t1; I2, t2 define the descent positions P11, P21.

The control unit 30 is configured to retrieve the descent coordinates I1, I2 defining the descent positions P11, P21 from the memory 35. The control unit 30 positions the grasping head 15 in the descent positions P11, P21 and initiates the descent of the grasping head 15 in the vertical direction V along the descent trajectories V1, V2.

The first vertical end position P12 and the second vertical end position P22 may be defined by only the sensing arrangement 66. A stop signal is thus generated by the control unit 30 when the sensing arrangement 66 detects a displacement of at least one detection element 55. Hence, when a contact between the gripping elements 17, 18 and a surface has been sensed. The surface can be a stack with insert sheets 11 or a row of folding boxes. Alternatively, the stop signal is generated when a plurality of sensors 70a, 70b have sensed displacement of their respective detection element 55a, 55b. Still in another embodiment, the stop signal is generated when one sensor has sensed a displacement and the threshold distance or time has been exceeded.

The present sensing arrangement 66 thus enables the grasping head 15 to sense the position of the insert sheets 11 at the loading location 9 and also sense the depositing surfaces 13, 14 at the deposit location 13. The depositing surfaces 13, 14 correspond to a top surface 13 of a row of folding boxes 3, and the bottom surface 14 of the receptacle 2.

This is an important improvement, as in comparison with the prior art WO2017/202500A1, a simpler system can be achieved which automatically adapts to variable operating conditions. The previous system in WO2017/202500A1 needed more programming parameters, especially when several layers of insert sheets 11 had to be deposited at different heights in the receptacle 2 (as illustrated in FIG. 2b). Hence, the control unit needed to retrieve predefined data for each vertical deposit position. However, in reality, the vertical position at which the rows of folding boxes were actually positioned often differed slightly from the theoretical position. Therefore, in order to alleviate the risk of damaging the boxes, the grasping head was decelerated before the theoretical deposit position was reached even if a loss in speed was compromised. Contrarily, with the present system, only a short setup time and simple programming of the coordinates of the descent positions P12, P21 is needed in order to obtain a precise system.

In addition to the before-mentioned advantages, the present grasping system 15' also improves reliability and durability. The grasping head 15 will automatically stop even if the sensed object is not an insert sheet 11 or a row of folding boxes 3. If for instance an object is present in the descent trajectories V1, V2 of the grasping head 15, the control unit 30 will also activate a stop of the grasping head 15 if a contact with the object has been sensed.

Another improvement in view of the system in WO2017/202500A1 is that the movable gripping elements 17, 18 are also configured to yield when a contact with an insert sheet 11 or a row of folding boxes has been detected. The stroke of the gripping elements 17, 18 can be selected such that the gripping elements 17, 18 are vertically movable after the sensing arrangement 66 has detected a contact. In such a way, the grasping head 15 can still yield against the stack of insert sheets or the row of folding boxes.

Optionally, in an embodiment, a time-lapse difference between the reception of the first sensor signal and the second sensor signal can be measured. If the difference exceeds a predefined threshold value, the control unit 30 may send an error signal to a central machine control system. Such a time difference between the sensor signals may be indicative of that the insert sheet 11 is picked up or deposited on an uneven surface.

In another (non-illustrated) embodiment, the sensing arrangement 66 comprises an electromechanical sensing switch comprising a mechanical latch configured to be activated at a predetermined displacement distance of the gripping elements 17, 18. The control unit 30 is configured to activate and deactivate the gripping elements 17, 18 in response to an activation of the electromechanical switch.

Figure 11:
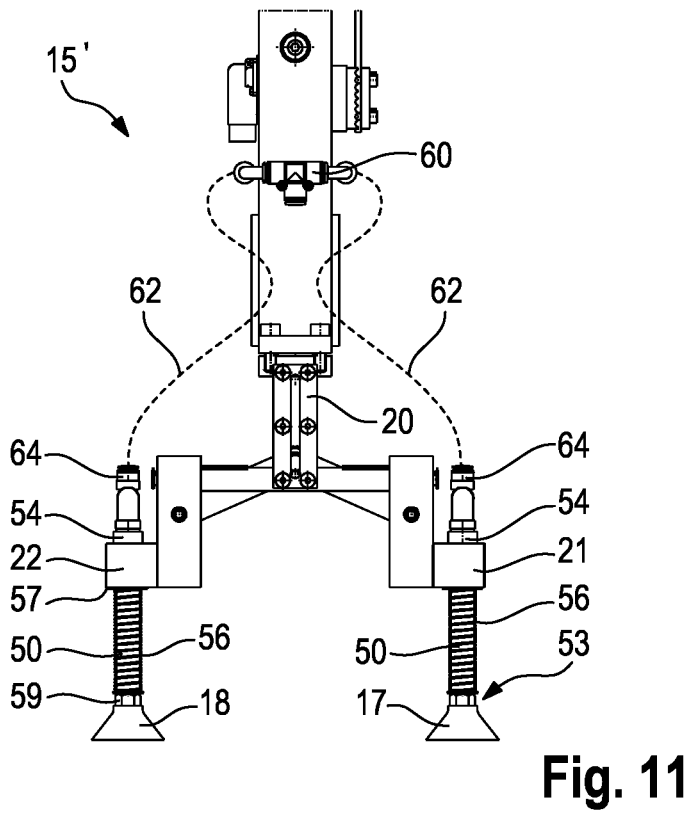
FIG. 11 shows a side view of the grasping head of FIG. 10 in a condition in which it is lowered onto an insert sheet.

In FIGS. 10 and 11, the grasping head 15 is shown in a condition before being placed on an insert sheet 11. The aspiration elements 17, 18 have their maximum distance from the respective support 21, 22, and supports 21, 22 have a maximum horizontal distance from each other.

For grasping an insert sheet 11, the grasping head 12 is moved vertically downwards until the aspiration elements 17, 18 touch the upper surface of the insert sheet 11 arranged in a stack in a loading location 9. This process is best illustrated in FIG. 1, which general working principles also apply to the present grasping system 15'. This contact stops a further downward movement of the aspiration elements 17, 18. As the holding elements 50 are vertically movable in relation to the support frame 80, the supports 21, 22 are moved further downwardly, whereby the stops 54 move vertically upwardly. This changes of position of the detection element 55 on the stop 54 with respect to supports 21, 22 and can be detected by the sensor 70.

In response to the corresponding signal from the sensor 70, the control unit 30 stops the drive means 16 from displacing grasping head 15 further downwardly.

In an advantageous embodiment, the control unit 30 is configured to send instructions to the actuator 25, which gradually stops/decelerates the downward movement of the grasping head 15 when the sensing arrangement 66 detects a vertical displacement of the holding elements 50 with respect to the support frame 80). The gradual deceleration provides a more controlled and softer contact between the aspiration elements 17, 18 and the insert sheet. The decelerated distance enables the aspiration elements 17, 18 to establish the vacuum connection. The biasing devices 56 also enables the aspiration elements 17, 18 to yield when they contact the insert sheet 11, such that any undesired deformation of the insert sheet 11 can be avoided.

Figure 12:
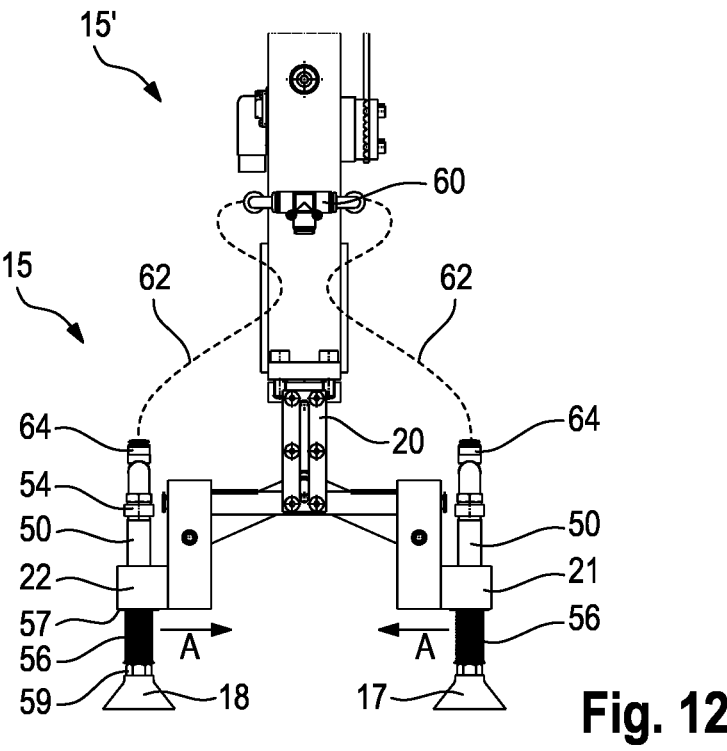
FIG. 12 shows a side view of the grasping head of FIG. 10 in a condition in which it is placed on an insert sheet.

This condition of grasping head 15 is shown in FIG. 12. It can be seen that biasing devices 56 are in a compressed state as supports 21, 22 have been displaced downwardly on holding elements 50.

In this condition, a vacuum generator (not shown) is connected to aspiration elements 17, 18 and is activated so that the respective insert sheet 11 is grasped by the aspiration elements 17, 18. Thereafter, groups of aspiration elements 17, 18 can be moved towards each other in the horizontal direction H as illustrated in FIG. 12 so as to arrive in the condition shown in FIG. 13 in which insert sheet 11 is held with a fold 12. This is possible as the first frame portion 80a and the second frame portion 80b are horizontally movable in relation to each other between a distal position in which the first 17 and second group of aspiration elements 18 are located distal from each other and a proximate position, in which the first and second groups aspiration elements 17, 18 are located closer to each (than in the distal position other).

In a subsequent step, the grasping head 15 is lifted upwardly so as to also lift the insert sheet 11 as illustrated in FIG. 14. This results in that the biasing devices 56 return to their uncompressed state and moves the aspiration elements 17, 18 such that they return to a position in which they are placed at a maximum distance from the supports 21, 22.

The insert sheet 11 can then be transported to the position in the storage container where the insert sheet 11 should be deposited. The control unit 30 determines based on information from the sensing arrangement 66 when the grasping head 15 is brought into contact with a bottom portion of the storage container 2 or a top surface of a row of folding boxes 3 located in the storage container 2.

The control unit 30 then gradually stops/decelerates the downward movement of the grasping head 15 and releases the vacuum such that the insert sheet is deposited. The aspiration elements 17, 18 can then be configured to actively release the insert sheet 11 by discharging/blowing air.

Preferably, as previously described, the vacuum duct in the suction members 17, 18 is configured to discharge air in order to release the vacuum and push the insert sheet 11 away from the aspiration elements 17, 18 as the insert sheet 11 is to be placed on top of the row of folding boxes 3.

The invention claimed is:

1. A grasping system for placing an insert sheet between rows of folding boxes in a receptacle, the grasping system comprising:
a grasping head configured to grasp and pick up the insert sheet from a loading location, and displace and position the insert sheet on a depositing surface in the receptacle,
the grasping head having a support frame and a plurality of gripping elements, the plurality of gripping elements configured to adhere to an upper surface of the insert sheet, the gripping elements being connected to the support frame via a plurality of holding elements, which are movably mounted to the support frame, and wherein the holding elements and the gripping elements are movable in a vertical direction in relation to the support frame when the gripping elements contact the insert sheet or the depositing surface in the receptacle,
wherein the grasping system further comprises a control unit and sensing arrangement, the sensing arrangement being configured to sense a vertical displacement of the holding elements with respect to the support frame, and wherein the control unit is configured to receive information from the sensing arrangement and determine when the grasping head is brought into contact with the insert sheet or the depositing surface,
wherein the control unit is configured to move the grasping head laterally to a first descent position stored as spatial coordinates in a memory and to a second descent position stored as spatial coordinates in the memory, and
wherein the control unit is configured to move the grasping head at a speed from the first descent position or the second descent position to a first loading position or a second loading position vertically aligned with the first descent position and the second descent position, respectively, the first descent position and second descent position defined by the sensing of the vertical displacement of at least one of the holding elements with respect to the support frame.

2. The grasping system of claim 1,
wherein the sensing arrangement comprises at least one sensor located on the support frame and at least one detection element located on at least a first holding element of the plurality of holding elements, the first holding element connecting a first gripping element of the plurality of gripping elements to the support frame,
wherein the at least one sensor is configured to sense a displacement of the at least one detection element, and
wherein the at least one sensor and the at least one detection element move apart as the first gripping element moves toward the support frame.

3. The grasping system according to claim 2, wherein the control unit is further configured to stop a further vertical downward movement of the grasping head when the sensing arrangement senses a vertical movement of at least one of the holding elements.

4. The grasping system according to claim 3,
the first and second descent positions defining a starting point of a first and second vertical descent trajectory, and wherein the first descent trajectory is vertically aligned with the loading location and the second descent trajectory is vertically aligned with the depositing location and wherein the control unit is configured to operate the grasping head to be moved into the first descent position and the second descent position, respectively.

5. The grasping system according to claim 4, wherein end points of the first and second vertical descent trajectories are defined by a first and second vertical end position, and wherein the first vertical end position and the second vertical end position are only defined by the sensing arrangement.

6. The grasping system according to claim 4, wherein the grasping system comprises a rectilinear guide and wherein the grasping head is linearly movable and guided by the rectilinear guide in a lateral direction, and wherein the descent positions are defined as one-dimensional coordinates in a horizontal plane in a direction along a longitudinal extension of the rectilinear guide.

7. The grasping system according to claim 2, wherein the depositing surface is an upper surface of a row of folding boxes or a bottom surface in the receptacle.

8. The grasping system according to claim 2, wherein the holding element is a rod which is received in an opening in the support frame, and wherein the rod comprises a free end onto which the gripping element is attached.

9. The grasping system according to claim 2, wherein the gripping elements are biased away from the support frame by biasing members.

10. The grasping system according to claim 2, wherein the control unit is configured to control the displacement of the grasping head and to operate the gripping elements in an alternating way between a gripping state and a release state such that the gripping elements are in the gripping state when the grasping head contacts the insert sheet in the loading location and in the release state when the grasping head subsequently contacts the depositing surface with the insert sheet.

11. The grasping system according to claim 2, wherein the sensing arrangement further comprises at least a second sensor located on the support frame and at least a second detection element located on at least a second holding element of the plurality of holding elements, the second holding element connecting a second gripping element of the plurality of gripping elements to the support frame.

12. The grasping system according to claim 11, wherein the sensor is a magnetic sensor or an inductive sensor and the detection element comprises a metallic material.

13. The grasping system according to claim 11, wherein the gripping elements are aspiration elements, configured to apply a suction force against the insert sheet.

14. The grasping system according to claim 13, wherein the control unit is configured to apply a vacuum to the grasping head when the sensor detects a displacement of the holding element with respect to the support frame and when the control unit determines that the grasping head is at the loading location.

15. The grasping system according to claim 14, wherein the gripping elements are configured to discharge air to apply a positive pressure against the insert sheet when the control unit determines the grasping head is in contact with the depositing surface.

16. The grasping system according to claim 2, wherein the support frame comprises a first frame portion comprising a first group of gripping elements and a second frame portion comprising a second group of gripping elements, and wherein the first and second frame portions are movable in relation to each other between a distal position in which the first and second group of gripping elements are located distal from each other and a proximate position, in which the gripping elements are located closer to each than in the distal position other, such that the first and second group of gripping elements are horizontally displaceable in relation to each other.

17. The grasping system according to claim 2, wherein the control unit is configured to gradually stop/decelerate a downward movement of the grasping head when the sensing arrangement detects the vertical displacement of the holding element with respect to the support frame.

18. The grasping system of claim 1, wherein the control unit is further configured to move the grasping head a vertical distance past the first or second descent position, and wherein the controller is configured to gradually decelerate the grasping head after reaching the first or second descent position.

19. A method of introducing an insert sheet into a receptacle or between rows of folding boxes by using a grasping head comprising a plurality gripping elements which are mounted on vertically displaceable holding elements, movably connected to a support frame including a first frame portion and a second frame portion, the method comprising:

moving the grasping head to be vertically aligned with a loading location and lowering the grasping head at a speed until the gripping elements contact an upper surface of the insert sheet, moving the support frame further downwards a predetermined distance whereby the support frame moves in relation to the holding elements and the gripping elements remain stationary against the upper surface of the insert sheet, detecting a displacement of at least one holding member, decelerating the movement of the grasping head from a first speed upon detection of the displacement of the at least one holding member, and stopping a further downward movement of the grasping head, grasping the insert sheet such that the insert sheet adheres to the gripping elements, moving the first frame portion closer towards the second frame portion such that the insert sheet is folded, picking up, displacing, and positioning the insert sheet such that the insert sheet is aligned with an opening in the receptacle, lowering the grasping head and placing the insert sheet on a depositing surface in the receptacle, moving the support frame further downwards a predetermined distance whereby the support frame moves in relation to the holding elements and while the insert sheet remains stationary against the upper surface of the insert sheet, detecting a displacement of at least one holding element and stopping a further downward movement of the grasping head, and releasing the gripping elements from the insert sheet.

20. The method according to claim 19, further comprising:

detecting, with a sensor, a vertical displacement of the holding elements in relation to the support frame, and stopping the vertical movement of the grasping head.

* * * * *